United States Patent [19]

Butler et al.

[11] Patent Number: 5,333,388

[45] Date of Patent: Aug. 2, 1994

[54] PROBES

[75] Inventors: Clive Butler, Kings Langley; Iden Shams, Finchley Central, both of England

[73] Assignee: British Technology Group Limited, London, England

[21] Appl. No.: 119,820

[22] PCT Filed: Jan. 16, 1991

[86] PCT No.: PCT/GB91/00059

§ 371 Date: Sep. 16, 1992

§ 102(e) Date: Sep. 16, 1992

[87] PCT Pub. No.: WO91/10887

PCT Pub. Date: Jul. 25, 199133338863100233556

[51] Int. Cl.⁵ .......................... G01B 11/03; G01B 5/03
[52] U.S. Cl. .......................................... 33/559; 33/556
[58] Field of Search ............... 33/559, 503, 556, 558, 33/561

[56] References Cited

U.S. PATENT DOCUMENTS

| | | |
|---|---|---|
| 4,177,568 | 12/1979 | Werner et al. |
| 4,352,246 | 10/1982 | Hauert |
| 4,477,976 | 10/1984 | Suzuki ..................... 33/558 |
| 4,941,266 | 7/1990 | Bissegger et al. .................... 33/556 |

FOREIGN PATENT DOCUMENTS

| | | |
|---|---|---|
| 0022598 | 1/1981 | European Pat. Off. |
| 0332575 | 9/1989 | European Pat. Off. |
| 8222757 | 10/1986 | Fed. Rep. of Germany |
| 3601910 | 7/1987 | Fed. Rep. of Germany |
| 2384230 | 10/1978 | France |
| 2134656 | 8/1984 | United Kingdom |

OTHER PUBLICATIONS

Patent Abstracts of Japan, vol. 8, No. 144 (P-284) (1581), Jul. 5, 1984 & JP, A, 59-43302 (Mitsutoyo Seisakusho K. K.) Mar. 10, 1984.

Primary Examiner—Christopher W. Fulton
Attorney, Agent, or Firm—Cushman, Darby & Cushman

[57] ABSTRACT

A probe for position-determining apparatus and the like having a housing and in the housing a sensing space and an aperture to the sensing space, a stylus extending out of the sensing space through the aperture, and a stylus-support at the aperture. The stylus is constrained in low-friction engagement with the stylus support towards a generally neutral axis while permitting position-determining displacement on the stylus support. The stylus is linked to the constraining low friction engagement through a lever arrangement including a first lever element extending sideways from and around the stylus and a second lever from the first lever to transfer stylus displacement to the constraining low friction engagement. The lever arrangement includes an abutment engageable by the second lever.

11 Claims, 1 Drawing Sheet

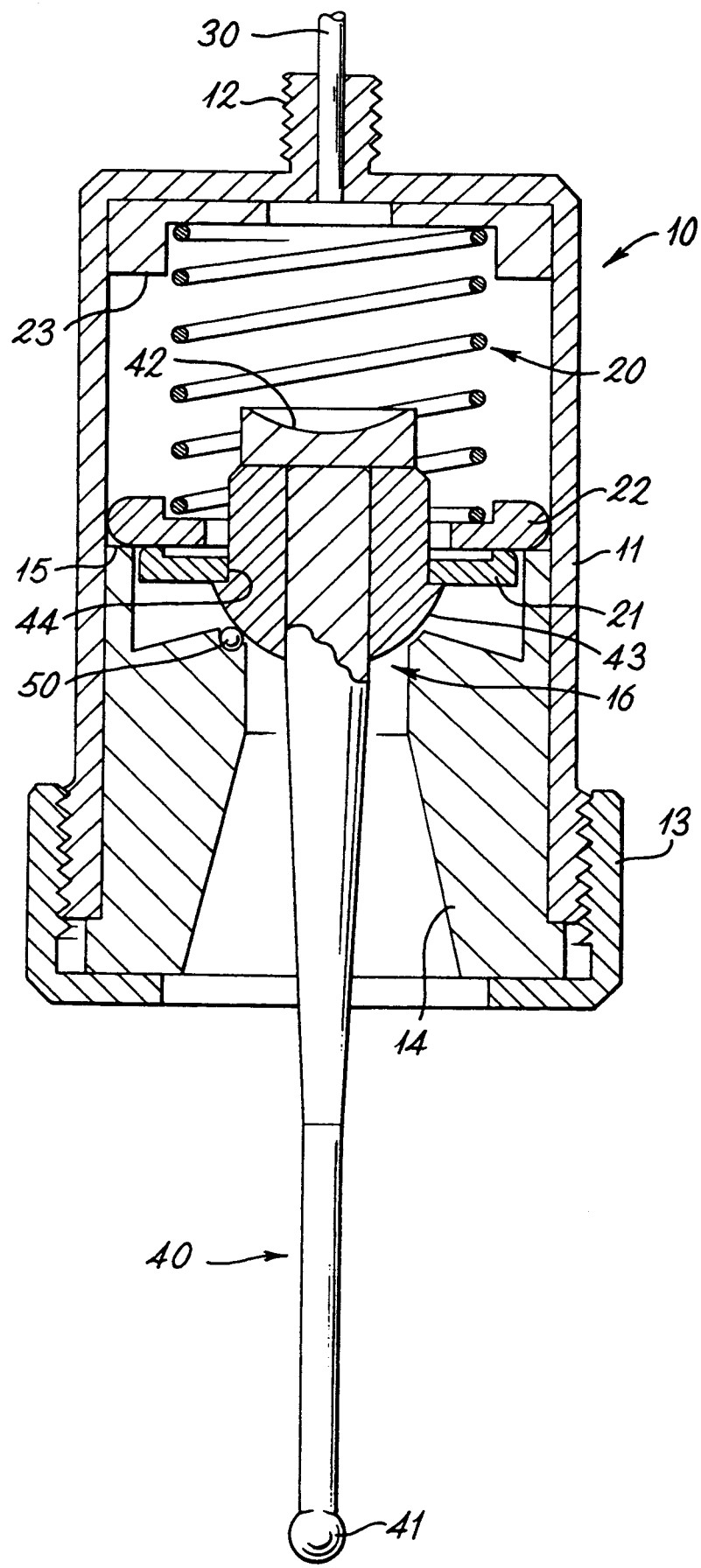

PROBES

This is a continuation of application Ser. No. 07/910,167, filed on Sep. 16, 1992, now abandoned.

FIELD OF THE INVENTION

This Invention relates to probes, such as are used with co-ordinate measuring and similar machines, to indicate a touch to an object.

BACKGROUND OF THE RELATED ART

In co-ordinate measuring and similar machines an object is measured by relative motion between a probe and an object in a controlled manner, usually from a datum, until a "touch" of the object is indicated by the probe. The co-ordinates of the touch position are recorded. By such repeated actions the dimensions of the object can be determined.

The aim of such measurements is to achieve precision to better than one micron with a repeatability of half a micron or less. Accordingly it is clear that the "touch" action must be very responsive and free from error. Probes to achieve such touch action usually use a light, thin stylus with a ball-end of hard material to touch the object. The touch action deflects the stylus in a mounting in the probe and the occurrence of the deflection of the stylus is sensed to cause the co-ordinates to be recorded.

Known probes provide good results in many measurements but in some measurements errors arise which cannot be compensated by corrections to the recorded co-ordinates. One cause for such errors is that deflections of the stylus in different directions requires different amounts of deflection before sensing occurs. Another cause is that an electromechanical switch operated by the stylus is used for the sensing action and the making or breaking of the switch is not consistent because of arcing or corrosion at the switch contacts. Probes used hitherto have electrical or mechanical connections to the stylus.

UK Patent Number GB 2,220,748A describes a probe with an external constraining means and a sensing arrangement consisting of a mirror on the stylus to deflect light away from a detector on deflection of the stylus.

SUMMARY OF THE INVENTION

According to the invention there is provided a probe for position-determining apparatus and the like having a housing and in the housing a sensing space and an aperture to the sensing space, a stylus extending out of the sensing space through the aperture, a stylus-support means at the aperture and means for constraining the stylus In low-friction engagement with the support means and generally towards a neutral axis while permitting position-determining displacement on the support means. The stylus is linked to the constraining means through a lever arrangement including a first lever element extending sideways from and around the stylus and a second lever from the first lever to transfer stylus displacement to the constraining means and constraint from the constraining means to the stylus. The lever arrangement includes an abutment engageable by the second lever.

The probe stylus has a spherical surface in the support means and the support means provides only localized contact to the spherical surface. The localized contact is formed by balls. Conveniently the stylus includes the spherical surface and the balls are housed around the aperture.

The stylus has a uniformly extending collar as the first lever. The constraining means is inside the housing and acts on the stylus collar first lever through a follower second lever engageable with the abutment held in the housing. Preferably the constraining means is arranged to urge the second lever onto the abutment against the resistance of the first lever to maintain the low-friction engagement with the stylus on the neutral axis. Conveniently this produces pre-stress. The the abutment is around the inside of the housing, which is circular, and the second lever is circular to fit on the abutment and the first lever is circular and is inside the abutment and, when in the natural position, level with or just above the level of the abutment and the second lever.

The parts of the probe may be arranged to retain their relationship and to not rotate relatively about the neutral axis. The sensing space may include means to send out radiation of a sensing means and means to collect radiation for a sensing means together with reflector means on the stylus to reflect sent out radiation on to the collector means until said reflector Is displaced against the constraining means on spherical movement of the stylus by a the position-determining displacement.

BRIEF DESCRIPTION OF THE DRAWING

Embodiments of the invention will now be described with reference to the accompanying drawing which is a schematic showing the cross-section of a probe embodying the Invention.

DESCRIPTION OF PREFERRED EMBODIMENTS

Referring to the single figure of the drawing, a housing is shown, indicated generally at 10, including a body 11 with a mounting shank 12 and a threaded end to receive an end cover 13.

A stylus carrier 14 is clamped into the housing between the body 11 and the end cover 13. A stylus 40 is supported in an aperture 16 in the carrier 14 on three equally-spaced balls, one of which is shown at 50.

The stylus part 43 which is actually in contact with the supporting balls is itself spherical, conveniently being machined from a large ball bearing. Together a low-friction support is thereby formed for the stylus. The stylus is urged into a defined resting position on the low-friction support by a spring 20 within the body 11. The spring 20 acts through the collar 21 and the follower 22 and a cup 23 arranged as shown in the drawing. The collar 21 forms a first lever and the follower 22 a second lever. The end 15 of carrier 14 provides an abutment for the second lever 22. The collar 21 may be integral with stylus 40 or may be pushfit. The collar 21 preferably has a radius at the outer edge to remove the adverse effect of a sharp edge acting on the follower and to permit any small amount of slip that is needed.

In one arrangement the collar 21 protrudes slightly beyond (about one micron) the abutment 15 so that spring 20 is arranged to force follower 22 onto abutment 15 and slightly distort collar 21 so that some pre-stress is present. In other embodiments a gap may be left so that no pre-stress exists. In another arrangement the surfaces of the abutment 15 and the collar 21 towards the follower 22 are both lapped to produce a common flush surface towards the follower 22 while the respective surface of the follower 22 In contact with this common surface is Itself lapped. A more accurate return of the stylus to the original or natural position after deflection is thus achieved.

The follower 22 and the cup 23 house the spring 20 in respective cavities. The collar 21 is fitted on stylus 40 around a neck 44 extending from the spherical part 43. A tilting of the stylus 40 in carrier 14 from contact with a fixed structure (a "touch") the causes collar 21 the to act as a first lever to tilt follower 22 acting as a second lever to deflect the spring 20 above the raised follower area, compressing the spring. The follower engages the end 15 of the carrier 14 to act as an abutment for the lever action when tilted by the stylus collar. When the cause of stylus tilt Is removed the compressed spring urges the levers of the collar 21 and the follower 22 to restore the stylus to a well-defined rest position. The follower 22 always comes back to rest on the abutment end 15 of the carrier 14 so this follower defines the rest position by action through the collar 21 on the stylus. Conveniently parts 20, 21, 22, 23 and 40 are restrained from relative rotation about the neutral axis and the carrier 14 by the action of the spring 20 but further measures may be used if required. Rotation should be prevented to avoid variation of the probe zero. It is also noted that the arrangements encourage single-point contact which improves repeatability.

A convenient sensing arrangement is to mount a concave mirror 42 on the stylus 40 and to direct light from an optical fiber arrangement 30 for reflection by the mirror 42 back to the optical fiber arrangement 30 for detection. As the light reflected back by the deflected mirror starts to move away from the fiber core the change in intensity is detected in a suitable optoelectronic circuit. A response of 10mV/micron is achieved, giving a sensitivity to displacements below one micron. In a particular arrangement the mirror and fiber are arranged so that all light reaching the mirror from the optical fiber is reflected back, apart from the losses, when the stylus is in the rest position. At a deflection of the stylus tip equal to half the tip radius (one millimeter in one example) the light reflected is reduced to become equal to the level of light from a fixed monitoring source (conveniently a fraction of the amount of light from the sensing source). This arrangement provides for a high sensitivity of detection. A detector arrangement can thus be provided to produce either a signal, such as a digital signal or an analog signal, or a switch either opening or closing.

If it is required to sense both the occurrence of a touch and its direction the optical fiber arrangement can be augmented to provide distinct sensing areas around a central point and respective sensing means whereby the relative illumination of each area can be compared to determine the direction of movement of the reflected light.

One example of a probe embodying the invention has a resting position (not the probe measurement) found to be within a few tens of microns. In a series of fifty measurements of the coordinates of a point of measurement the error in measurement was within one micron, which has the resolution limit of the coordinate measuring machine.

Clearly the spherical surface could be provided in the stylus carrier 14 and the balls could be housed in the stylus, which need not then have a spherical shape. If preferred both the stylus and carrier could have a spherical form the balls caged between them. In another arrangement tile carrier 14 could have a knife-edge or other small-area surface to support the spherical surface of the stylus. An air bearing is also possible. Other details and arrangements will be apparent to those skilled tn the art.

We claim:

1. A probe for position-determining apparatus, said probe comprising:
   a housing having a sensing space and an aperture to said sensing space;
   a stylus extending out of said sensing space through said aperture;
   stylus support means at said aperture;
   means for constraining said stylus into low-friction engagement with said support means and generally towards a neutral axis while permitting position-determining displacement of said stylus, said stylus being linked to said constraining means through a lever arrangement, said lever arrangement including:
   i.) a first lever extending sideways from and around said stylus;
   ii.) a second lever from said first lever to transfer a displacement of said stylus to said constraining means and to transfer a constraint from said constraining means to said stylus; and
   iii.) said lever arrangement including an abutment engageable by said second lever.

2. A probe according to claim 1, in which:
   said stylus has a spherical surface; and
   said support means provides only localized contact to said spherical surface.

3. A probe according to claim 2, in which said localized contact is formed by balls.

4. A probe according to claim 3, in which said balls are housed around said aperture.

5. A probe according to claim 1, in which said first lever is a uniformly extending collar.

6. A probe according to claim 5, in which said constraining means is inside said housing and acts on said first lever collar through said second lever.

7. A probe according to claim 1 in which said constraining means is arranged to urge said second lever onto said abutment against a resistance of said first lever to maintain said low-friction engagement of said stylus.

8. A probe according to claim 1 wherein there is pre-stress in at least one of said first and second levers.

9. A probe according to claim 1 wherein:
   said abutment is around an inside of said housing, said housing being circular; and
   said second lever is circular to fit on said abutment; and
   said first lever is circular and is to an inside of said abutment and, when in said neutral position, said first lever protrudes just above said abutment and contacts said second lever.

10. A probe according to claim 1 wherein said first lever, said second lever, said stylus, and said constraining means are arranged to not rotate about the neutral axis.

11. A probe according to claim 1 wherein said sensing space further includes:
   means to send out radiation of a sensing means;
   means to collect said radiation of said sensing means; and
   reflector means on said stylus to reflect said radiation indicating said position-determining displacement.

* * * * *